3,245,978
CROSSLINKING POLYETHYLENE WITH ALUMINUM COMPOUND

Razmic S. Gregorian, Silver Spring, Md., and Frank A. Mirabile, Wayne, N.J., assignors to W. R. Grace & Co., New York, N.Y., a corporation of Connecticut
No Drawing. Filed Apr. 2, 1964, Ser. No. 356,947
19 Claims. (Cl. 219—345)

This application is a continuation-in-part of applications Serial Nos. 194,710 and 194,711 filed on May 5, 1962, and now abandoned.

This invention relates to crosslinked polyolefins and method of preparing same. More particularly this invention is concerned with crosslinking polyethylene with a novel class of compounds.

Polymers of ethylene such as those described in U.S. 2,153,553 and in U.S. 2,816,883 are well known in the art today and are generally characterized by their organic solvent solubility and their thermoplastic properties. Lately several methods have been tried with varying success to decrease the thermoplasticity and solubility of polyethylene by crosslinking same. Chemical crosslinking is presently preferred to irradiation for most purposes due to the economics of the process. With regard to polyethylene, the main classes of chemical crosslinking agents have been organic peroxides and azo compounds with the former being preferred due to greater uniformity of product obtained. In any event, to date, all known chemical crosslinking processes are temperature dependent in regard to the crosslinking agent employed. Such dependency is a series drawback and restricts the use of the various crosslinking agents to a marked degree. For example benzoyl peroxide at the necessary blending temperatures is hazardous because the mixture may decompose violently. Other peroxides lack a sufficiently long half-life at the temperature of incorporation into the molten polymer to permit uniform crosslinking therein. This latter problem is especially prevalent where the polymer is high density polyethylene, i.e. 0.94–0.97 described in U.S. 2,816,883 which has a melting point of at least 127° C. This high melting point necessitates the use of very high processing temperatures, e.g. 150–200° C., whereat most known crosslinking agents decompose at an excess rate thereby crosslinking the polymer to a high degree so rapidly that compounding, molding, extruding or other shaping operations are impossible on a commercial scale. Still other peroxide crosslinking agents, in the operable blending temperature range, have half-lives in excess of periods which would be commercially acceptable. Thus there has been a long felt want of a crosslinking system for polyethylene the components of which are not dependent upon temperature for decomposition into free radicals with their accompanying crosslinking effect.

One object of the instant invention is to provide novel compounds capable of crosslinking polyethylene which are not temperature dependent. It is another object of this invention to provide novel compounds capable of crosslinking polyethylene under the conditions disclosed herein which are not thermally unstable until they are exposed to air or free oxygen. It is a particular object of this invention to provide novel compounds capable of crosslinking polyethylene under the conditions herein disclosed which allow polyethylene containing same to be shaped by commercial methods e.g. extrusion, molding, and the like without fear of scorch in the absence of free oxygen (e.g. air).

In summary these and other objects are attained by blending polyethylene in an inert oxygen free atmosphere at a temperature above its softening point with an aluminum compound of the formula:

$$AlR_{3n}R'_{2-2n}R''_{1-n}$$

wherein R is a member of the group consisting of aryl, hydrogen, alkyl, aralkyl and cycloalkyl, R' is alkyl, hydrogen or a halogen, R'' is a member of the group consisting of hydrogen, halogen and alkoxy radicals and $n$ is an integer from 0 to 1 and thereafter exposing the blend to free oxygen (e.g. air) to effect crosslinking of the polyethylene.

Thus in accord with the aforesaid formula, aluminum compounds such as triphenyl aluminum, trinaphthyl aluminum, diisopropyl aluminum ethoxide, diethyl aluminum isobutoxide, diisobutyl aluminum isopropoxide, diisopropyl aluminum octoxide, diethyl aluminum hexoxide, diethyl aluminum chloride, diisobutyl aluminum chloride, dioctyl aluminum iodide, diethyl aluminum iodide, diisobutyl aluminum iodide, diisohexyl aluminum bromide, dimethyl aluminum bromide, ethyl aluminum sesquichloride, triethyl aluminum, triisobutyl aluminum, diisobutyl aluminum hydride, tri-n-propyl aluminum, aluminumisoprenyl, diethyl aluminum chloride, ethylaluminum dichloride, diisobutyl aluminum chloride, isobutyl aluminum dichloride, tri-n-butyl aluminum, tri-n-hexyl aluminum, triisohexyl aluminum, tri-n-octyl aluminum, tri-n-decyl aluminum, diethyl aluminum iodide, diethyl aluminum fluoride, methyl aluminum sesquichloride, ethylisobutyl aluminum chloride, octyl aluminum difluoride, trioctyl aluminum, dioctyl aluminum chloride, dioctyl aluminum hydride, methyl aluminum dihydride, octyl aluminum dihydride, methyl aluminum diiodide, ethyl aluminum dibromide, diethyl aluminum methoxide, ethyl aluminum dihydride, tricyclopentyl aluminum, tricyclohexyl aluminum, diphenyl methyl aluminum, tribenzyl aluminum, and the like are operable in the instant invention.

The crux of the invention lies in the fact that the aluminum compound on admixture with polyethylene can survive heat treatment without crosslinking in the absence of air or free oxygen and on exposure thereto initiate crosslinking of the polymer. Thus the aluminum compound is not temperature dependent i.e. it does not trigger the crosslinking reaction at any set temperature in an inert oxygen free atmosphere. However on exposing the polyethylene, aluminum compound blend to air or free oxygen crosslinking is immediately initiated.

It is critical in performing this invention that the polymer and the aluminum compound be blended in an ogygen free atmosphere to insure that crosslinking will not occur during blending. In some instances on blending where minute amounts of air or oxygen are present, a small degree of crosslinking is tolerable so long as the polymer remains thermolabile and does not become thermoset and unworkable. However, since the crosslinking reaction requires the presence of both the aluminum compound and air or free oxygen, if absolutely no crosslinking is desired, then all oxygen should be excluded in the blending step.

The blending step can be carried out in various ways. For example the aluminum compound can be mixed in an oxygen free atmosphere with polyethylene preferably in powdered form prior to heating the blend above the softening point of the polymer. A solvent can be used to more uniformly disperse the aluminum compound throughout the polymer. Another method of blending would be to imbibe the polymer in a solvent which will have a swelling effect on the polymer and thereafter add the aluminum compound to the swelled polymer. Still another method of blending is to add the aluminum compound with or without a solvent therefor to the molten polyethylene. Solvents for the aluminum compounds can be employed if desired and are used primarily as a safety precaution and as an aid to uniformity of dispersion.

The blending step is suitably performed in an inert oxygen free atmosphere by mechanically mixing the aluminum compound into the polyethylene at temperatures at which the polymer is sufficiently soft to be worked. In the case of low density polyethylene this temperature is about 90° C.–125° C. while in the case of high density polyethylene it is about 135–200° C. Higher temperatures are operable but are unnecessary. Suitable equipment for the blending step would include that which can be adapted to maintain an oxygen free system such as Brabender Plastographs, Banbury mixers, two roll mills, injection molding machines, extruders and the like.

The amount of the aluminum compound employed can vary between wide limits. A range of 0.0010 to 0.10 or more moles of aluminum compound per 100 grams polyethylene is operable, and 0.0015 to 0.05 moles aluminum compound per 100 grams polyethylene is preferred. The degree of crosslinking in the instant invention is dependent upon the amount of aluminum compound added to the system. Larger amounts of aluminum compound within the aforesaid operable range will yield a thermoset polyethylene whereas amounts at the lower end of the operable range will crosslink the polymer to a point whereat the polymer remains thermoplastic with a lower melt index.

The system during blending can be maintained oxygen free by using a vacuum or by a positive pressure of an inert gas such as nitrogen or the noble gases e.g. argon.

The crosslinking step is performed by contacting the aluminum compound-polyethylene blend with free oxygen or air. Crosslinking of the blend can be carried out at temperatures ranging from room temperature up to 300° C. or higher. Since polyethylene is subject to thermal degradation at temperatures of about 300° C. it is preferred to crosslink the polymer at a lower temperature. One method of crosslinking the polymer is to blend the aluminum compound and polyethylene in an oxygen-free extruder hopper, pass the blend through the heated barrel of the extruder to flux the polymer and then immediately prior to passing the molten blend through the lips of the extruder die, add oxygen or air to the system and initiate crosslinking in a molten condition. Another method would be to pass the molten blend out of the die without adding oxygen to the extruder and let the molten polymer crosslink in air. Still another method is to allow the molten blend to cool to room temperature in an inert atmosphere and thereafter expose the blend to air or free oxygen.

The crosslinked polyethylene produced by the instant invention can be used in the same manner as the commercial crosslinked polyethylene now in use. Such uses include film, pipe and the like.

The polyethylene-aluminum compound compositions may include other additives which do not interact directly with the aluminum compound such as those normally employed in plastic compositions. By such additives is meant the inclusion of plasticizing, lubricating, extending, filling e.g. carbon black, stabilizing, flame retarding and coloring ingredients such as dyes and pigments and also anti-oxidants, antistatic materials and the like. The choice of such additives would be obvious to one skilled in the art. Plasticizing and lubricating additives are added to the composition in amounts ranging from 1–25% by weight of the polyethylene. Extenders, fillers e.g. carbon black and flame retardants are added in amounts ranging from 1–100% by weight of the polyethylene. Stabilizers, dyes, pigments, anti-oxidants and antistatic additives are added in amounts ranging from 0.01–10% by weight of the polyethylene.

Crosslinking of the polyethylene composition of the present invention frequently is performed simultaneously with the formation of the polymer into shaped articles by means such as molding, calendering, extruding and the like. Various shaped products e.g. wire, pipe, cable, film and sheeting are readily obtainable by the operation of this invention. However it should be noted that the crosslinking and shaping operations need not be performed simultaneously. In some instances it is to one's advantage to shape the blended polyethylene-aluminum compound composition in an inert oxygen free atmosphere and thereafter expose the shaped articles to free oxygen or air to initiate crosslinking.

The following examples are set down for solely illustrative purposes and are not to be deemed limiting in scope.

Throughout the instant invention the melt indices (MI) were measured under the conditions specified in ASTMD 1238–52T. The densities of the polyethylene were measured in accord with the conditions specified in ASTMD 1505–57T.

Unless otherwise noted a Brabender Plastograph Model PL–V2 adapted to maintain an oxygen-free atmosphere e.g. nitrogen or a vacuum and equipped with a recording unit for measuring changes in torque was used for the blending step. The crosslinking step was also performed on the Brabender Plastograph by introducing air or oxygen into the mixing chamber. The degree of crosslinking obtained when the polyethylene coposition containing the aluminum compound is exposed to free oxygen or air is related to the increase in torque measured by the Plastograph recorder from the time free oxygen or air is added to the system until the reaction is discontinued. The greater the degree of crosslinking the greater the viscosity of the polyethylene composition which in turn requires a greater torque in order to drive the Plastograph at a constant r.p.m. Another method employed to show the occurrence of crosslinking is the measurement of melt indices of the polymer before and after subjecting it to crosslinking. Melt index varies inversely with molecular weight. Since the process of crosslinking essentially produces an increase in molecular weight, a lower melt index after the crosslinking step evidences that crosslinking occurred. Yet another method of measuring the degree of crosslinking is the percent gel content of the crosslinked polyethylene. The percent gel content of polyethylene in the instant invention were measured by refluxing for 24 hours a weighed sample (approximately 0.5 g.) of polyethylene in a cellulose Soxhlet thimble in xylene containing 0.3 weight percent 2,6-ditertiary-butyl-4-methyl-phenol commercially available under the tradename "Ionol" from Shell Oil Corp. The insoluble portion of the polyethylene sample after drying was weighed to calculate percent gel as follows:

$$\text{percent gel} = \frac{\text{weight insoluble sample}}{\text{total weight sample}} \times 100$$

EXAMPLE 1

38 g. of commercially available polyethylene having a melt index of 0.7 and a density of 0.96 were charged to the oxygen-free mixing chamber of a Brabender Plastograph which had been evacuated and flushed three times with nitrogen. The polymer was milled in the chamber at 170° C. until molten. 3.8 g. dioctyl aluminum iodide in a benzene solution was added to the mixing chamber under a stream of nitrogen and milling was continued to uniformly disperse the aluminum compound in the molten polymer and obtain a constant torque. On removing the top from the mixing chamber, thus exposing the polymer charge to air, an increase of 900 kilogram-meters of torque was recorded.

EXAMPLE 2

35.0 g. of commercially available polyethylene having a melt index of 1.5 and a density of 0.915 were charged to the oxygen free mixing chamber of a Brabender Plastograph which had been alternately evacuated and flushed with nitrogen. The polymer was milled until molten at 155–175° C. 0.624 g. of diethyl aluminum isobutoxide in a benzene solution was added to the mixing chamber under a stream of nitrogen and milling was continued for 20 minutes. The top was removed from the mixing chamber admitting air. The increase in torque measured from the admission of air to the chamber until the reaction was discontinued was about 1000 kilogram-meters.

EXAMPLE 3

35 g. of commercially available polyethylene having a melt index of 1.5 and a density of 0.915 were charged to the mixing chamber of a Brabender Plastograph which had been alternately evacuated and flushed with nitrogen to obtain an oxygen free system. The polymer was milled until molten at a temperature in the range 165–180° C. for 15 minutes. 1.0 ml. of a solution of triphenyl aluminum in benzene (0.299 g. triphenyl aluminum/ml. benzene) was added to the mixing chamber under nitrogen and milling continued for 15 minutes. The top of the mixing chamber was removed exposing the molten polymer mixture to air. The increase in torque from the time air was admitted to the system until the reaction was discontinued was greater than 1000 kilogram-meters. The crosslinked polyethylene in the form of "crumb" extruded from the chamber. The melt index of the crosslinked product was less than 0.4.

EXAMPLE 4

Example 3 was repeated except that 0.2 g. of diethyl aluminum isobutoxide in a benzene solution was added. The increase in torque on exposing the system to air was in excess of 1500 kilogram-meters. The melt index of the crossslinked product was less than 0.3.

EXAMPLE 5

Example 3 was repeated except that 2.14 g. of diisopropyl aluminum hexoxide in benzene was added. The torque increased in excess of 800 kilogram-meters in 30 minutes on exposing the molten blend to air.

EXAMPLE 6

100 g. of commercially available polyethylene having a melt index of 5.0 and a density of 0.96 were admixed under nitrogen with $1.3 \times 10^{-2}$ moles of diisohexyl aluminum bromide in a benzene solution and fed through a NRM 1 inch Bench Extruder. After about a 2½ minute residence time in the extruder at a temperature in the range 142 to 165° C., the extrudate in the form of rod (35–41 mils diameter) was collected on a roller in air. The crosslinked polyethylene product had a melt index of 0.00.

EXAMPLE 7

35 g. of commercially avaialble polyethylene having a melt index of 5.0 and a density of 0.96 were admixed under nitrogen with $2.5 \times 10^{-3}$ moles of diisobutyl aluminum isopropoxide in a benzene solution in a Brabender Plastograph at a temperature in the range 179–187° C. After milling for 15 minutes to obtain uniform mixing and a constant torque the system was opened to the atmosphere. An increase in torque in excess of 600 kilogram-meters was observed from the time air was admitted to the system until the reaction was discontinued.

EXAMPLE 8

Example 7 was repeated except that $2.5 \times 10^{-3}$ moles of diethyl aluminum chloride in a benzene solution was substituted for the diisobutyl aluminum isopropoxide. An increase in torque in excess of 1500 kilogram-meters was measured on admitting air to the system. The crosslinked product had a melt index less than 2.0.

EXAMPLE 9

35 g. of substantially saturated polyethylene having a melt index of 5.0 and a density of 0.96 and less than 0.10 vinyl groups/1000 carbon atoms as measured by infrared were milled at a temperature of about 179° C. in an oxygen free mixing chamber of a Brabender Plastograph which had previously been vacuated and flushed three times with nitrogen. $2.5 \times 10^{-3}$ moles of diisobutyl aluminum iodide in a benzene solution was added to the chamber under nitrogen and milling continued for 10 minutes until a constant torque was maintained. The mixing chamber was opened to air and in 12 minutes the torque increased 1000 kilogram-meters. The crosslinked product had a melt index of less than 2.0.

EXAMPLE 10

35 g. of commercially available polyethylene having a density of 0.915 and a melt index of 2.0 were charged to a 2 liter resin kettle equipped with gas inlet and outlet and a distillation column. The kettle was placed in a heated oil bath at a temperature of about 120° C. after the addition of about 400 ml. benzene (sodium dried). Nitrogen was bubbled through the mixture. After the distillation of about one half of the benzene solvent, $1.25 \times 10^{-2}$ moles of dispropyl aluminum ethoxide in a benzene solution was added at about 135° C. under nitrogen to the mixture. Distillation was continued under nitrogen. Nitrogen addition was discontinued and the system was then evacuated prior to bubbling air through the mixture. The temperature rose to about 145° C. and heating was continued with air addition until substantially all the benzene was distilled off leaving a polymer residue. The polymer residue was removed from the kettle and vacuum oven dried at 50° C. overnight. The thus dried polymer on characterization had a melt index of less than 0.5 and a percent gel content of greater than 5%.

EXAMPLE 11

100 g. of commercially available polyethyelne having a melt index of 5.0 and a density of 0.96 were admixed under nitrogen with $1.3 \times 10^{-2}$ moles of diisobutyl aluminum chloride in a benzene solution and fed through a NRM 1 inch Extruder Bench Model 50-17 V. After about a 2½ minute residence time in the extruder at a temperature in the range 144–155° C., the extrudate in rod form (20–35 ml. diameter) was collected on a take up roll in air. Samples of the extrudate were pressed at 350° F. at atmospheric pressure for 4 minutes followed by a 5 minute press at 20,000 p.s.i. and 350° F. The thus pressed extrudate samples on characterization had a melt index of less than 2.0.

EXAMPLE 12

1.0 pound of commercially available polyethylene having a melt index of 0.7 and a density of 0.96 was admixed under nitrogen in an oxygen free atmosphere with $32.4 \times 10^{-3}$ moles of diisobutyl aluminum isopropoxide in benzene and fed under nitrogen pressure to a 1 inch NRM Extruder machine equipped with a shallow screw and a pressure die mounted in a crosshead so that extrusion takes place at an angle of about 90° with the axis of the extruder. About a 2½ minute residence time in the extruder at a temperature in the range 145–170° C., the polyethylene-aluminum compound blend was extruded over a preheated single strand copper wire (25 mils diameter) to give a coating about 100 mils thick. The molten polymer wire coating after leaving the die and contacting air, crosslinked in situ and was collected on a take up roll. On characterization the coating had a melt index of 0.0.

EXAMPLE 13

38 g. of commercially available polyethylene having a melt index of 0.7 and a density of 0.96 were charged to the oxygen free mixing chamber of a Brabender Plastograph which had been evacuated and flushed three times with nitrogen. The polymer was milled in the chamber at 170° C. until molten. 1.0 ml. of a solution of triisobutyl aluminum in cyclohexane (1.8 g. triisobutyl aluminum/10 ml. cyclohexane solution) was added to the mixing chamber under a stream of nitrogen and milling was continued to uniformly disperse the aluminum compound in the molten polymer and obtain a constant torque. On removing the top from the mixing chamber, thus exposing the polymer charge to air, an increase of 900 kilogram-meters of torque was recorded in a 12 minute period.

EXAMPLE 14

35.0 g. of commercially available polyethylene having a melt index of 5.0 and a density of 0.96 were charged to the oxygen free mixing chamber of a Brabender Plastograph which had been alternately evacuated and flushed with nitrogen. The polymer was milled until molten at 179° C. 5.0 ml. of a solution of triisohexyl aluminum in heptane (0.141 g. triisohexyl aluminum/ml. heptane) was added to the mixing chamber under a stream of nitrogen and milling was continued for 25 minutes. The top was removed from the mixing chamber admitting air. The increase in torque measured on the admission of air to the chamber was about 4400 kilogram-meters.

EXAMPLE 15

35 g. of commercially available polyethylene having a melt index of 5.0 and a density of 0.96 were charged to the mixing chamber of a Brabender Plastograph which had been alternately evacuated and flushed with nitrogen to obtain an oxygen free system. The polymer was milled until molten at a temperature in the range 178–190° C. for 15 minutes. 1.0 ml. of a solution of triisohexyl aluminum in heptane (0.299 g. triisohexyl aluminum/ml. heptane) was added to the mixing chamber under nitrogen and milling continued for 16 minutes. The top of the mixing chamber was removed exposing the molten polymer mixture to air. The increase in torque from the time air was admitted to the system until the reaction was discontinued was greater than 3000 kilogram-meters. The crosslinked polyethylene in the form of "crumb" extruded from the chamber. The melt index of the crosslinked product was 0.39.

EXAMPLE 16

Example 15 was repeated except that 3 ml. of a solution of triisohexyl aluminum in heptane (0.299 g. triisohexyl aluminum/ml. heptane) was added. The increase in torque on exposing the system to air was in excess of 2500 kilogram-meters in 5 minutes. The melt index of the crosslinked product was 0.41.

EXAMPLE 17

Example 15 was repeated except that 5 ml. of a solution of triisohexyl aluminum in heptane (0.299 g. triisohexyl aluminum/ml. heptane) was added. The torque increased in excess of 3500 kilogram-meters in 15 minutes on exposing the molten blend to air.

The examples in Table I show the operability of the instant invention with low density polyethylene. In all examples in Table I the polymer used was commercially available polyethylene having a melt index of 1.5 and a density of 0.915. The blending was performed in a Brabender Plastograph under nitrogen with the subsequent crosslinking step being carried out in air at a milling temperature in the range 175–185° C. The increase in torque was measured from the time the molten polymer blend was exposed to air. On crosslinking, in all the examples in Table I, the polymer crumbled out of the mixing chamber.

Table I

| Example No. | Polyethylene, g. | Al(isohexyl)$_3$, moles | Torque increases, kilogram-meters | Melt Index of Crosslinked Product |
|---|---|---|---|---|
| 18 | 35.0 | 1.06×10$^{-3}$ a | 2,000 | 0.14 |
| 19 | 35.0 | 5.0×10$^{-3}$ a | 1,600 | |
| 20 | 35.0 | 4.24×10$^{-3}$ b | 1,000 | 0.08 | a Al(isohexyl)$_3$ added as a solution in heptane (1.06×10$^{-3}$ moles Al(isohexyl)$_3$/ml. heptane.
b Al(isohexyl)$_3$ added in pure form.

EXAMPLE 21

100 g. of commercially available polyethylene having a melt index of 5.0 and a density of 0.96 were admixed under nitrogen with 1.3×10$^{-2}$ moles of triisohexyl aluminum in a 10 ml. solution of heptane and fed through a NRM 1 inch Bench Extruder. After about a 2½ minute residence time in the extruder at a temperature in the range 142 to 165° C., the extrudate in the form of rod (35–41 mils diameter) was collected on a roller in air. The crosslinked polyethylene product had a melt index of 0.00.

EXAMPLE 22

35 g. of commercially available polyethylene having a melt index of 5.0 and a density of 0.96 were admixed under nitrogen with 2.5×10$^{-3}$ moles of diisobutyl alumunium hydride in a heptane solution in a Brabender Plastograph at a temperature in the range 179–187° C. After milling for 15 minutes to obtain uniform mixing and a constant torque the system was opened to the atmosphere. An increase in torque in excess of 2000 kilogram-meters was observed from the time air was admitted to the system until the reaction was discontinued.

EXAMPLE 23

Example 22 was repeated except that 2.5×10$^{-3}$ moles of triethyl aluminum in a benzene solution was substituted for the diisobutyl aluminum hydride. An increase in torque in excess of 1500 kilogram-meters was measured on admitting air to the system.

EXAMPLE 24

35 g. of substantially saturated polyethylene having a melt index of 5.0, a density of 0.96 and less than 0.10 vinyl groups/1000 carbon atoms as measured by infrared were milled at a temperature of about 179° C. in an oxygen free mixing chamber of a Brabender Plastograph which had previously been vacuated and flushed three times with nitrogen. 2.5×10$^{-3}$ moles of diisobutyl aluminum hydride in a 5 ml. heptane solution was added to the chamber under nitrogen and milling continued for 10 minutes until a constant torque was maintained. The mixing chamber was opened to air and in 8 minutes the torque increased 1000 kilogram-meters. The crosslinked product had a melt index of 2.52.

EXAMPLE 25

35 g. of commercially available polyethylene having a density of 0.915 and a melt index of 2.0 were charged to a 2 liter resin kettle equipped with gas inlet and outlet and a distillation column. The kettle was placed in a heated oil bath at a temperature of about 120° C. after the addition of 400 ml. benzene (sodium dried). Nitrogen was bubbled through the mixture. After the distillation of about one half of the benzene solvent, 5 ml. of a heptane solution containing 1.25×10$^{-2}$ moles of diisobutyl aluminum hydride was added at about 135° C. under nitrogen to the mixture. Distillation was continued under nitrogen. Nitrogen addition was discontinued and the system was then evacuated prior to bubbling air through the mixture. The temperature rose to about 150° C. and heating was continued with air addition until substantially all the benzene was distilled off leaving a polymer residue. The polymer residue was removed from the kettle and vacuum oven dried at 50° C. overnight. The thus dried polymer on characterization had a melt index of 0.022 and a percent gel content of 15.7%.

EXAMPLE 26

100 g. of commercially available polyethylene having a melt index of 5.0 and a density of 0.96 were admixed under nitrogen with $1.3 \times 10^{-2}$ moles of triisohexyl aluminum in a 10 ml. solution of heptane and fed through a NRM 1 inch Extruder Bench Model 50-17 V. After about a 2½ minute residence time in the extruder at a temperature in the range 144–155° C., the extrudate in rod form (20–35 ml. diameter) was collected on a take up roll in air. Samples of the extrudate were pressed at 350° F. with no load for 4 minutes followed by a 5 minute press at 20,000 p.s.i. and 350° F. The thus pressed extrudate samples on characterization had a percent gel content of 8.3%.

EXAMPLE 27

1.0 pound of commercially available polyethylene having a melt index of 0.7 and a density of 0.96 was admixed under nitrogen in an oxygen free atmosphere with $32.4 \times 10^{-3}$ moles of diisobutyl aluminum hydride in 40 ml. heptane and fed under nitrogen pressure to a 1 inch NRM Extruder machine equipped with a shallow screw and a pressure die mounted in a crosshead so that extrusion takes place at an angle of about 90° with the axis of the extruder. After about a 2½ minute residence time in the extruder at a temperature in the range 145–170° C. the polyethylene-aluminum compound blend was extruded over a preheated single strand copper wire (25 mils diameter) to give a coating about 105 mils thick. The molten polymer wire coating after leaving the die and contacting air, crosslinked in situ and was collected on a take up roll.

What is claimed is:

1. Composition useful in the production of crosslinked polyethylene on exposure to free oxygen consisting essentially of polyethylene and 0.0010 to 0.10 moles per 100 grams of polyethylene of an aluminum compound of the formula:

$$AlR_{3n}R'_{2-2n}R''_{1-n}$$

within R is a member of the group consisting of hydrogen, alkyl, aralkyl, cycloakyl and aryl, R' is a member of the group consisting of hydrogen, halogen and alkyl, R'' is a member of the group consisting of hydrogen, halogen and alkoxy radicals and $n$ is an integer from 0 to 1.

2. The composition according to claim 1 wherein the aluminum compound is triethyl aluminum.

3. The composition of claim 1 wherein the aluminum compound is diisobutyl aluminum hydride.

4. The composition of claim 1 wherein the aluminum compound is diethyl aluminum isobutoxide.

5. The composition of claim 1 wherein the aluminum compound is diisobutyl aluminum chloride.

6. The composition of claim 1 wherein the aluminum compound is triisobutyl aluminum.

7. The method of crosslinking polyethylene, comprising mixing together, in an inert oxygen free atmosphere polyethylene at a temperature above its softening point and about 0.0010 to 0.10 moles per 100 grams of polyethylene of an aluminum compound of the formula:

$$AlR_{3n}R'_{2-2n}R''_{1-n}$$

in which R is a member of the group consisting of hydrogen, alkyl, aralkyl, cycloakyl and aryl, R' is a member of the group consisting of hydrogen, halogen and alkyl, R'' is a member of the group consisting of hydrogen, halogen and alkaxy radicals and $n$ is an integer from 0 to 1 and thereafter exposing the resulting mixture to free oxygen to effect crosslinking of the polyethylene.

8. The method of claim 7 wherein the aluminum compound is triethyl aluminum.

9. The method of claim 7 wherein the aluminum compound is diisobutyl aluminum hydride.

10. The method of claim 7 wherein the aluminum compound is diethyl aluminum isobutoxide.

11. The method of claim 7 wherein the aluminum compound is diisobutyl aluminum chloride.

12. The method of claim 7 wherein the aluminum compound is triisobutyl aluminum.

13. The method of crosslinking polyethylene comprising mixing together in an inert oxygen free atmosphere, polyethylene and about 0.0010 to 0.10 moles per 100 grams of polyethylene of an aluminum compound of the formula:

$$AlR_{3n}R'_{2-2n}R''_{1-n}$$

wherein R is a member of the group consisting of hydrogen, alkyl, aralykl, cycloalkyl and aryl, R' is a member of the group consisting of hydrogen, halogen and alkyl, R'' is a member of the group consisting of hydrogen, halogen and alkoxy radicals and $n$ is an integer from 0 to 1 and thereafter at a temperature above the softening point of the polyethylene, exposing the resulting mixture to free oxygen to effect crosslinking of the polyethylene.

14. The method of claim 13 wherein the aluminum compound is triethyl aluminum.

15. The method of claim 13 wherein the aluminum compound is diisobutyl aluminum hydride.

16. The method of claim 13 wherein the aluminum compound is diethyl aluminum isobutoxide.

17. The method of claim 13 wherein the aluminum compound is diisobutyl aluminum chloride.

18. The method of claim 13 wherein the aluminum compound is triisobutyl aluminum.

19. The method of claim 13 wherein the crosslinking is performed in an inert hydrocarbon solvent for the polyethylene.

No references cited.

JOSEPH L. SCHOFER, *Primary Examiner.*

L. EDELMAN, *Assistant Examiner.*